(12) United States Patent
Kazmierczak et al.

(10) Patent No.: US 6,212,031 B1
(45) Date of Patent: *Apr. 3, 2001

(54) RADIALLY-LOADED, SNAP-FIT DISC MOUNTING SYSTEM FOR A DISC DRIVE

(75) Inventors: Frederick Frank Kazmierczak, San Jose; Michael Kenneth Andrews, Santa Cruz, both of CA (US); Thomas R. Prentice, Luther, OK (US)

(73) Assignee: Seagate Technology LLC, Scotts Valley, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/977,648

(22) Filed: Nov. 24, 1997

(51) Int. Cl.$^7$ .................................................. G11B 17/08
(52) U.S. Cl. ...................................... 360/98.08; 360/99.12
(58) Field of Search ............................... 360/98.08, 99.12

(56) References Cited

U.S. PATENT DOCUMENTS

| 5,243,481 | * | 9/1993 | Dunckley | 360/99.08 |
| 5,367,418 | * | 11/1994 | Chessman | 360/99.12 |
| 5,426,548 | * | 6/1995 | Fujii | 360/99.12 |
| 5,659,443 | * | 8/1997 | Berberich | 360/98.08 |
| 5,872,681 | * | 2/1999 | Boutaghou | 360/99.12 |

* cited by examiner

Primary Examiner—A. J. Heinz
(74) Attorney, Agent, or Firm—Shawn B. Dempster; Edward P. Heller III

(57) ABSTRACT

A disc mounting system for mounting the discs of a disc drive in a fixed radial relationship to the hub of a spindle motor. The disc mounting system includes a radially-loaded, snap-fit disc mounting ring associated with each disc. The disc mounting rings include disc contact features for interaction with the inner diameters of the discs, and hub contact features for axially positioning the discs and associated disc mounting rings relative to the spindle motor hub. Various embodiments of the disc mounting ring are disclosed.

14 Claims, 8 Drawing Sheets

RADIALLY-LOADED, SNAP-FIT DISC MOUNTING SYSTEM FOR A DISC DRIVE

FIELD OF THE INVENTION

This invention relates generally to the field of hard disc drive data storage devices, or disc drives, and more particularly, but not by way of limitation, to a new system for mounting the discs to the hub of a spindle motor in a disc drive.

BACKGROUND OF THE INVENTION

Disc drives of the type known as "Winchester" disc drives, or hard disc drives, are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator bearing housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator bearing housing opposite to the coil, the actuator bearing housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator bearing housing, with the attached head suspensions and head assemblies, in accordance with the well-known Lorentz relationship. As the actuator bearing housing rotates, the heads are moved radially across the data tracks along an arcuate path.

Disc drives of the current generation are included in desk-top computer systems for office and home environments, as well as in laptop computers which, because of their portability, can be used wherever they can be transported. Because of this wide range of operating environments, the computer systems, as well as the disc drives incorporated in them, must be capable of reliable operation over a wide range of ambient temperatures.

Furthermore, laptop computers in particular can be expected to be subjected to large amounts of mechanical shock as they are moved about. It is common in the industry, therefore, that disc drives be specified to operate over ambient temperature ranges of from, for instance, −5° C. to 60° C., and further be specified to be capable of withstanding operating mechanical shocks of 100 G or greater without becoming inoperable.

One of the areas of disc drive design which is of particular concern when considering ambient temperature variations and mechanical shock resistance is the system used to mount the discs to the spindle motor. During manufacture, the discs are mounted to the spindle motor in a temperature- and cleanliness-controlled environment. Once mechanical assembly of the disc drive is completed, special servo-writers are used to prerecord servo information on the discs. This servo information is used during operation of the disc drive to control the positioning of the actuator used to move the read/write heads to the desired data location in a manner well known in the industry. Once the servo information has been recorded on the discs, it is assumed by the servo logic that the servo information, and all data subsequently recorded, are on circular tracks that are concentric with relation to the spin axis of the spindle motor. The discs, therefore, must be mounted to the spindle motor in a manner that prevents shifting of the discs relative to the spindle motor due to differential thermal expansion of the discs and motor components over the specified temperature range, or due to mechanical shock applied to the host computer system.

Several systems for clamping of the discs to the spindle motor have been described in U.S. Patents, including U.S. Pat. No. 5,528,434, issued Jun. 18, 1996, U.S. Pat. No. 5,517,376, issued May 14, 1996, U.S. Pat. No. 5,452,157, issued Sep. 19, 1995, U.S. Pat. No. 5,333,080, issued Jul. 26, 1994, U.S. Pat. No. 5,274,517, issued Dec. 28, 1993 and U.S Pat. No. 5,295,030, issued Mar. 15, 1994, all assigned to the assignee of the present invention and all incorporated herein by reference. In each of these incorporated disc clamping systems, the spindle motor of the disc drive includes a disc mounting flange extending radially from the lower end of the spindle motor hub. A first disc is placed over the hub during assembly and brought to rest on this disc mounting flange. An arrangement of disc spacers and additional discs are then alternately placed over the spindle motor hub until the intended "disc stack" is formed. Finally, some type of disc clamp is attached to the spindle motor hub which exerts an axial clamping force against the uppermost disc in the disc stack. This axial clamping force is passed through the discs and disc spacers and squeezes the disc stack between the disc clamp and the disc mounting flange on the spindle motor hub.

From the above description, it would appear that the only element that would need to be considered when designing a disc clamping system would be the disc clamp, with any requirement for additional clamping force being met by an increase in the strength of the disc clamp. However, with the industry trend of size reduction in the overall disc drive, the size of various components within the disc drive has also been reduced, including the thickness of the discs. As the discs have grown thinner, the amount of clamping force that can be applied to the discs without causing mechanical distortion of the discs has also fallen. That is, due to inescapable tolerance variation in the flatness of the disc mounting flange on the spindle motor, the discs themselves and the disc spacers between adjacent discs, as well as the yield strength of the disc material, only a finite amount of axial clamping force can be applied to the inner diameters of the discs before the desired flatness of the disc surfaces is lost.

Furthermore, the amount of non-operating mechanical shock which the disc drive is specified to withstand is constantly being increased, with future disc drive products being considered which must be capable of operating after experiencing non-operating mechanical shocks in the range of 1000 G.

In light of these facts, it is clear that the currently common practice of axially loading the disc stack to prevent shifting of the discs relative to the spindle motor hub has nearly reached its maximum useful extreme, and a new system for mounting the discs to the spindle motor hub must be provided.

SUMMARY OF THE INVENTION

The present invention is a disc mounting system for mounting the discs of a disc drive in a fixed radial relationship to the hub of a spindle motor. The disc mounting system includes a radially-loaded, snap-fit disc mounting ring associated with each disc. The disc mounting rings include disc contact features for interaction with the inner diameters of the discs, and hub contact features for axially positioning the discs and associated disc mounting rings relative to the spindle motor hub. Various embodiments of the disc mounting ring are disclosed.

It is a object of the invention to provide a system for mounting the discs in a disc stack to the hub of a spindle motor used to rotate the discs in a disc drive.

It is another object of the invention to provide a disc mounting system which prevents shifting of the discs relative to the hub of the spindle motor due to differential thermal expansion.

It is another object of the invention to provide a disc mounting system which prevents shifting of the discs relative to the hub of the spindle motor due to the applications of large mechanical shocks.

It is another object of the invention to provide a disc mounting system that is suitable for use in a high volume manufacturing operation.

It is another object of the invention to provide a disc mounting system that can be implemented in a high volume manufacturing operation in an economical manner.

The manner in which these objects are achieved, as well as other features and benefits of the invention, can best be understood by a review of the following DETAILED DESCRIPTION OF THE INVENTION, when read in conjunction with an examination of the accompanying drawings.

BRIEF DESCRIPTION OF THE DRAWINGS

FIGS. 2-1 and 2-2 are simplified sectional elevation views of typical prior art disc mounting systems which utilize only axial loading to secure the discs.

FIGS. 13-1 and 13-2 are elevation and section views showing details of the hub contact feature of FIG. 12.

DETAILED DESCRIPTION OF THE INVENTION

Figure 1:
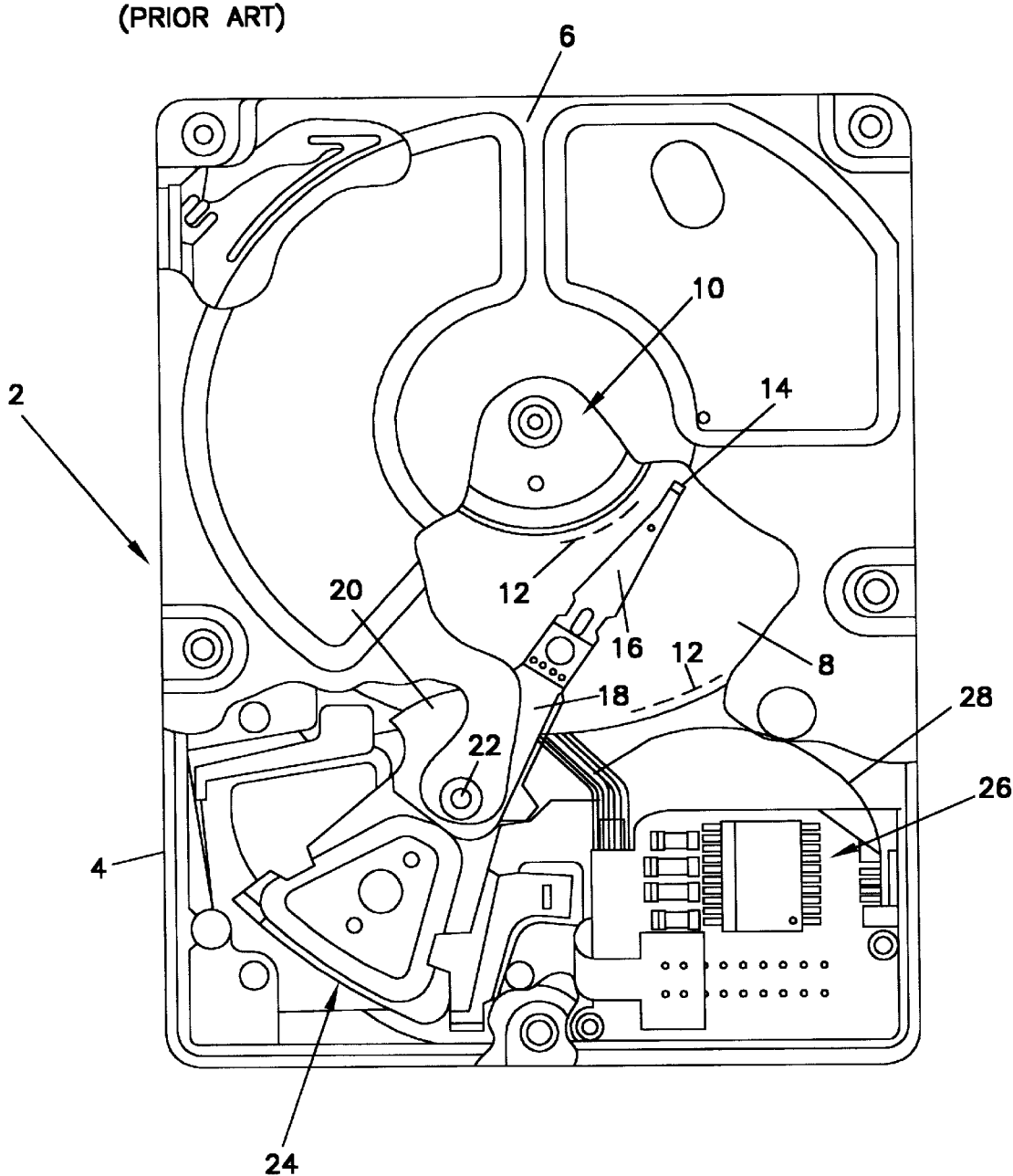
FIG. 1 is a top plan view of a prior art disc drive in which the present invention is particularly useful.

Turning now to the drawings and specifically to FIG. 1, shown is a plan view of a disc drive 2 in which the present invention is particularly useful. The disc drive 2 includes a base member 4 to which all other components are directly or indirectly mounted and a top cover 6 (shown in partial cutaway) which, together with the base member 4, forms a disc drive housing which encloses delicate internal components and isolates these components from external contaminants.

The disc drive includes a plurality of discs 8 which are mounted for rotation on a spindle motor shown generally at 10. The discs 8 include on their surfaces a plurality of circular, concentric data tracks, the innermost and outermost of which are shown by dashed lines at 12, on which data are recorded via an array of vertically aligned head assemblies (one of which is shown at 14). The head assemblies 14 are supported by head suspensions, or flexures 16, which are attached to actuator head mounting arms 18. The actuator head mounting arms 18 are integral to an actuator bearing housing 20 which is mounted via an array of ball bearing assemblies (not designated) for rotation about a pivot shaft 22.

Power to drive the actuator bearing housing 20 in its rotation about the pivot shaft 22 is provided by a voice coil motor (VCM) shown generally at 24. The VCM 24 consists of a coil (not separately designated) which is supported by the actuator bearing housing 20 within the magnetic field of an array of permanent magnets (also not separately designated) which are fixedly mounted to the base member 4, all in a manner well known in the industry. Electronic circuitry (partially shown at 26, generally, and partially carried on a printed circuit board (not shown)) to control all aspects of the operation of the disc drive 2 is provided, with control signals to drive the VCM 24, as well as data signals to and from the heads 14, carried between the electronic circuitry and the moving actuator assembly via a flexible printed circuit cable (PCC) 28.

Figures 1, 2:
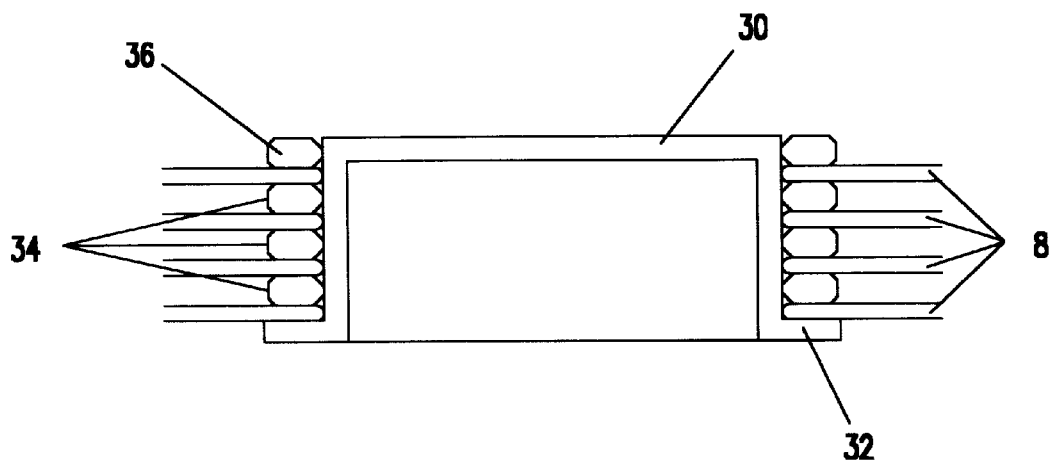
Figure 2:
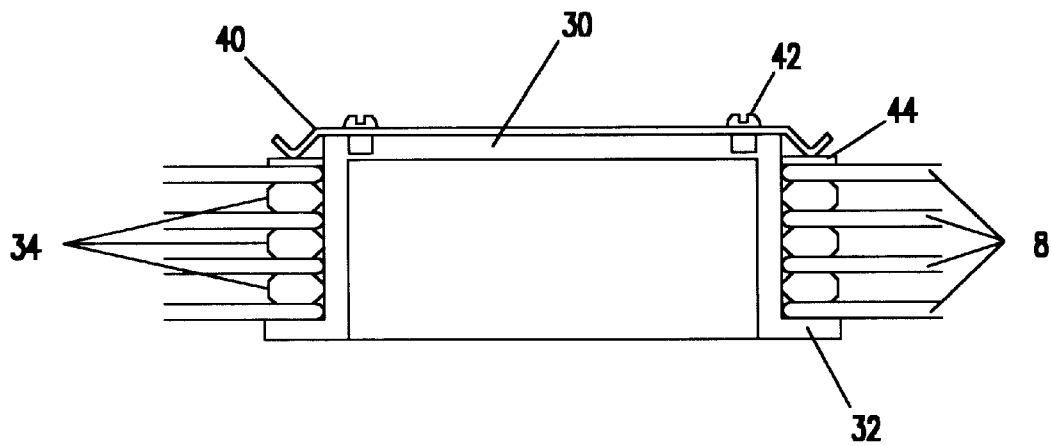

FIG. 2-1 is a simplified sectional elevation view of a typical prior art disc mounting system which utilizes axial loading to secure the discs. The figure shows a hub 30 of a spindle motor having a radially extending disc mounting flange 32 at its lower extreme. The hub 30 is substantially cup-shaped, being closed at the upper end and open at the lower end. The person of skill in the art will appreciate that the electrical and magnetic components (not shown) to rotate the hub 30 would typically be located within the hub.

FIG. 2-1 also shows a plurality of discs 8 and disc spacers 34. The disc stack is assembled by placing a first disc 8 over the hub 30 to rest against the disc mounting flange 32. The stack is formed by then alternately placing disc spacers 34 and discs 8 over the hub until the intended number of discs 8 have been positioned. A disc clamp 36 is then assembled to the uppermost portion of the hub 30 to complete the assembly. While the figure shows an example disc stack which includes four discs, the person of skill in the art will appreciate that the scope of the present invention includes disc stacks having both greater and lesser numbers of discs.

In FIG. 2-1, the disc clamp 36 is of the type referred to in the industry as a "shrink-fit" clamp. Such clamps have an inner diameter that is nominally smaller than the outer diameter of the hub 30. Assembly is accomplished by heating the clamp 36 to cause thermal expansion great enough to allow the clamp 36 to pass over the hub 30. The designed amount of axial loading is then applied to the disc clamp 36 and the clamp 36 is allowed to cool and shrink into interference fit with the hub 30.

Turning now to FIG. 2-2, shown is a simplified diagrammatic sectional elevation view, similar to that of FIG. 2-1, showing a second prior art disc clamping system. FIG. 2-2 shows a spindle motor hub 30 incorporating a disc mounting flange 32 similar to that shown in FIG. 2-1, and a stack of discs 8 and disc spacers 34, also similar to those of FIG. 2-1.

FIG. 2-2 shows a disc clamp 40 of the type known in the industry as a "spring clamp". Such spring disc clamps 40 are typically formed from flat sheet stock having the desired spring characteristics and include circumferential corrugations closely adjacent the outer diameter of the disc clamp which form a contact surface (not designated) for exerting force to the disc stack when a plurality of screws 42 are assembled through the disc clamp 40 into threaded holes (also not designated) in the hub 30. It is also typical for disc clamping systems incorporating such spring disc clamps 40 to include a washer member 44 between the contact surface of the disc clamp 40 and the upper surface of the uppermost disc 8. This washer member 44 aids in evenly distributing the clamping force of the disc clamp 40 about the circumference of the mounting portion of the discs 8 and allows for slip contact between the contact surface of the disc clamp 40 and the washer member 44 when the screws 42 are tightened, thus preventing the exertion of radial stresses directly to the uppermost disc 8.

Selection of the material and geometry of the disc clamp 40 will determine the amount of axial clamping force exerted by the disc clamping system of FIG. 2-2, as will be appreciated by persons of skill in the art. Details of typical disc clamping systems incorporating a spring clamp such as that of FIG. 2-2 can be found in previously incorporated U.S. Pat. Nos. 5,274,517 and 5,295,030.

Both of these two prior art disc clamping systems share a common drawback. Specifically, since the inner diameter of the discs must be at least slightly larger than the outer diameter of the spindle motor hub to allow for assembly ease, the discs are subject to radial displacement relative to the spindle motor hub after assembly due to differential thermal expansion and applied mechanical shocks. And, since all clamping forces applied to the disc stack are in the axial direction, all resistance to such radial shifting of the discs relative to the spindle motor hub is, therefore, purely a function of the amount of applied axial force and the coefficient of friction of the disc stack components. As previously noted hereinabove, with the continuing market trend for higher and higher mechanical shock tolerances, such purely axially loaded disc mounting systems are becoming unsatisfactory.

Figure 3:
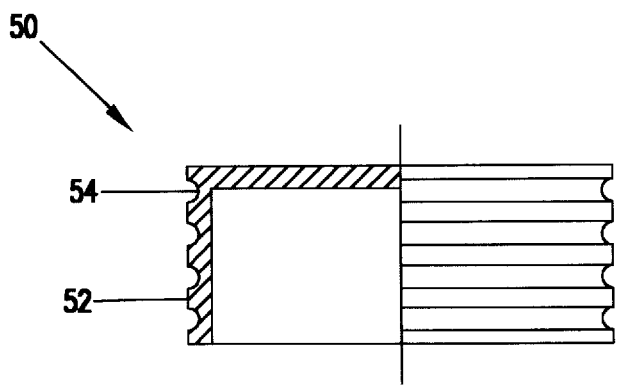
FIG. 3 is an elevation view, partially in section, of a spindle motor hub which has been fabricated in accordance with a first aspect of the invention.

FIG. 3 is an elevation view, partially in section, of a spindle motor hub 50 which has been fabricated in accordance with one aspect of the present invention. Specifically, the left side of FIG. 3 shows the spindle motor hub 50 in section, while the right side of FIG. 3 shows the spindle motor hub 50 in elevation. As can be seen in the figure, the spindle motor hub 50 does not include a disc mounting flange, as was the case with both of the prior art disc mounting systems explained above.

The spindle motor hub 50 has an outer diameter 52 selected to interact with a disc mounting ring, as will be described below, and includes an annular groove 54 associated with each disc to be mounted in the disc stack, as will also be described below. In the figure, the annular grooves have an arcuate profile, but can also be made with a rectangular profile.

Figure 4:
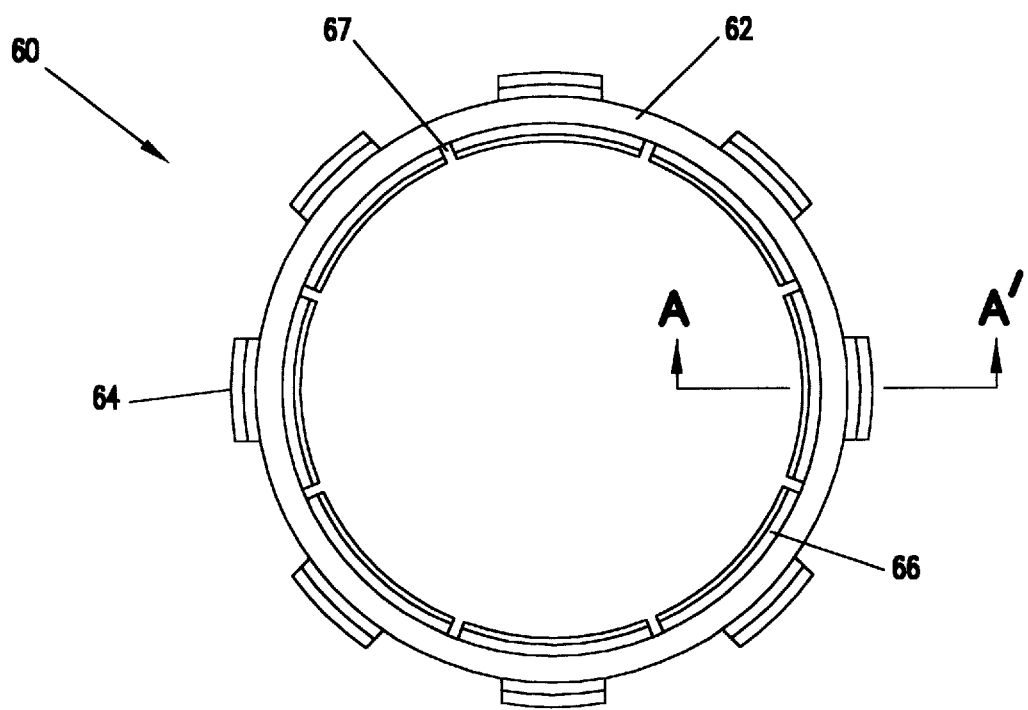
FIG. 4 is a plan view of a first embodiment of a disc mounting ring which is a portion of the present invention.

FIG. 4 is a plan view of a first embodiment of a disc mounting ring 60 that forms a portion of the present invention. The disc mounting ring 60 includes a radially-extending planar portion 62, which forms a bridge between a plurality of disc contact features 64 at the outer periphery of the disc mounting clamp 60, and a plurality of hub contact features 66 arrayed about the inner periphery of the disc mounting ring 60. In the example pictured in FIG. 4, there are eight disc contact features 64 and eight hub contact features 66, but the actual number of each of these is envisioned to be dependent upon other disc drive design considerations, and therefore is not considered as limiting to the scope of the invention. Indeed, there may be either more or less of the disc and hub contact features 64, 66 and the number of disc contact features 64 does not have to be the same as the number of hub contact features 66.

Furthermore, the hub contact features 66 are shown in the example of FIG. 4 to extend over a greater circumferential extent than do the disc contact features 64, and the centers of both disc and hub contact features 64, 66 are shown as being aligned. In fact, the hub contact features 66 are shown as being separated only by narrow notches 67 to allow the hub contact features to act as individual spring elements, as will be discussed below. Again, the circumferential extent of the hub and disc contact features 66, 64 and their relative locations are not considered as limiting to the scope of the invention.

It is presently envisioned that the disc mounting ring 60 is formed of a stainless spring steel, such as 414 stainless steel, however any material having the characteristics to provide the functions described below is envisioned to fall within the scope of the invention.

Figure 5:
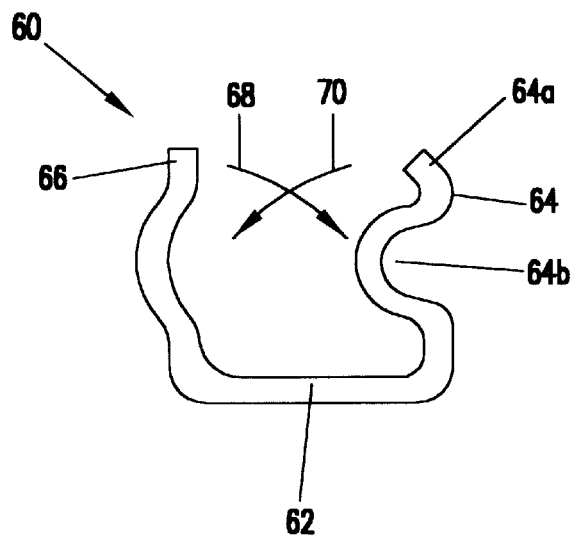
FIG. 5 is a sectional view, taken along line A–A' of FIG. 4.

The specific configuration of the disc contact features 64 and the hub contact features 66 is best seen in FIG. 5.

FIG. 5 is a sectional elevation view, taken along line A–A' of FIG. 4, showing the shape of the disc contact features 64 and the hub contact features 66. As can be seen in the figure, the disc mounting ring 60 has a substantially U-shaped cross section, with the hub and disc contact features 64, 66 forming the sides of the U-shape and the planar portion 62 connecting the two.

The hub contact feature 66 can be seen to extend upward from the planar portion 62, and to be formed in an arcuate manner. That is, a rounded groove is formed in a substantially flat wall and extends radially inward. The manner in which the hub contact feature 66 interacts with the spindle motor hub will be discussed below.

The disc contact feature 64 shows it to be formed in a complex bend, which provides both an angled ramp surface 64a and a disc engagement groove 64b. The manner in which the disc contact feature 66 interacts with the inner diameter of the disc will also be discussed below.

As previously mentioned, it is envisioned that the disc mounting ring 60 will be fabricated from a material having spring characteristics, and that the hub contact feature 66 is capable of being bent outward, in the direction of arrow 68, and then returning to the shape shown when the bending force is released. Similarly, the disc contact feature 64 is capable of being bent inward, in the direction of arrow 70, and then returning to the shape shown upon removal of the bending force.

Figure 6:
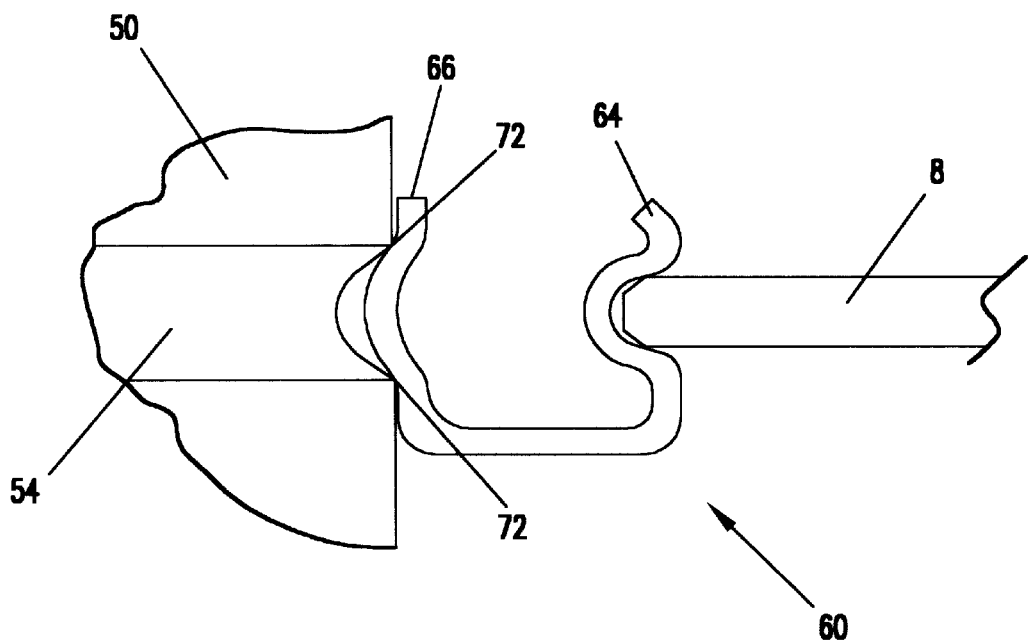
FIG. 6 is a simplified elevation and sectional view showing the assembled relationship between the disc mounting ring of FIGS. 4 and 5, a disc and the spindle motor hub of FIG. 3.

The manner in which the disc mounting ring 60 provides both radial and axial positioning of the disc relative to the spindle motor hub can best be seen in FIG. 6.

FIG. 6 is an elevation view of a portion of a spindle motor hub 50, such as that described above in relationship to FIG. 3, a sectional view of a disc mounting ring 60 similar to that of FIG. 5 and the inner portion of a disc 8, showing their assembled relationship. As can be seen in the figure, the arcuate portion of the hub contact feature 66 is shown in engagement with the annular groove 54 in the spindle motor hub 50, and the inner diameter of the disc 8 is seated in the disc engagement groove (64b in FIG. 5) in the disc contact feature 64. Since the radius of the arcuate portion of the hub contact feature 66 is greater than the radius of the annular groove 54, contact between the two components occurs only at the two points 72 where the arcuate portion of the hub contact feature 66 meets the edges of the annular groove 54. Since, as will be recalled from the discussion of FIG. 4 above, the hub contact features 66 extend circumferentially, the contact points 72 actually represent circular contact lines between the annular grooves and the disc contact features 66, firmly establishing the axial position of the disc mounting ring 60 relative to the spindle motor hub 50. Also, because contact between the disc mounting ring 60 and the spindle motor hub occurs only at the top and bottom edges of the annular groove 54, the annular grooves 54 could be formed with a rectangular profile without functionally impacting the invention.

FIG. 6 also shows that the disc 8 is formed at its innermost extent with bevels (not separately designated). The curvature of the disc engagement groove (64b in FIG. 5) is selected to cooperate with the radially outermost corners of the bevels on the disc inner diameter to firmly establish the axial position of the disc 8 relative to the disc mounting ring 60, and thus, through the previously discussed hub contact feature 66 and annular groove 54, relative to the spindle motor hub 50.

Assembly of the components of the disc drive to the configuration shown in FIG. 6 can be accomplished in several different orders and manners. For instance, a disc mounting ring 60 can be assembled to the inner diameter of a disc 8 and this combination of components then placed over the spindle motor hub 50 into engagement with the annular grooves 54. Alternatively, a disc mounting ring 60 can be first mounted in engagement with the annular groove 54 in the spindle motor hub 50, and then a disc 8 can be engaged with the disc engagement groove (64b in FIG. 5) of the mounted disc mounting ring 60.

When mounting the disc mounting ring 60 to the spindle motor hub 50, the disc mounting ring 60 can be simply pressed downward over the spindle motor hub 50, displacing the hub contact feature 66 outward (in the direction of arrow 68 in FIG. 5). Such simple pressing of the disc mounting ring 60 over the spindle motor hub 50, however, creates a risk of particle generation. It is undoubtedly better, therefore, if an assembly tool (not shown) is utilized to radially displace the hub contact features 66 outward (in the direction of arrow 68 in FIG. 5), thus allowing the disc mounting ring 60 to be placed over the spindle motor hub 50. Once the disc mounting ring 60 is positioned at its desired axial location relative to the spindle motor hub 50, the assembly tool would be removed, allowing the hub contact features 66 to spring back and engage the annular groove 54 in the spindle motor hub 50.

Similarly, while the ramp surface (64a in FIG. 5) of the disc contact feature 64 of the disc mounting ring 60 can be configured to allow a disc 8 to be press-mounted, the preferred mounting operation would include the use of an assembly tool to bend the disc contact features 64 radially inward (in the direction of arrow 70 in FIG. 5). A disc 8 can then be placed over the disc mounting ring 60, and the disc contact features 64 released to firmly engage the inner diameter of the disc 8.

In yet another alternative assembly methodology, the disc mounting ring can be radially split at a single location on its circumference. The disc mounting ring can then be spread to allow placement over the spindle motor hub, and then allowed to spring back into engagement with the desired annular groove in the spindle motor hub. After the disc mounting ring is thus mounted on the spindle motor hub, a disc would then be mounted in contact with the disc contact features of the disc mounting ring, ensuring that the disc mounting ring could not spread and disengage from the spindle motor hub.

Figure 7:
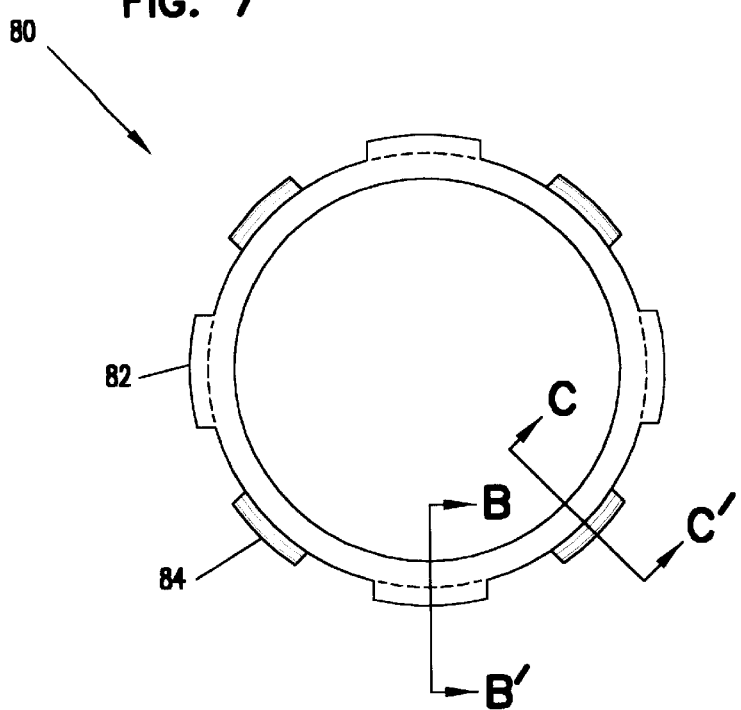
FIG. 7 is a plan view of a second embodiment of a disc mounting ring which is a portion of the present invention.

FIG. 7 is a plan view of an alternative embodiment of a disc mounting ring 80. The disc mounting ring 80 includes a plurality of downward-extending fingers 82 and a plurality of upward-extending fingers 84. While FIG. 7 shows an example disc mounting ring 80 having four downward-extending fingers 82 and four upward-extending fingers 84, the actual number of these elements of the disc mounting ring 80 is not considered as limiting to the scope of the invention. The configuration of the downward and upward-extending fingers 82, 84, and their relationship to an associated disc, can best be seen in FIGS. 8 through 10, which will be described below.

Figure 8:
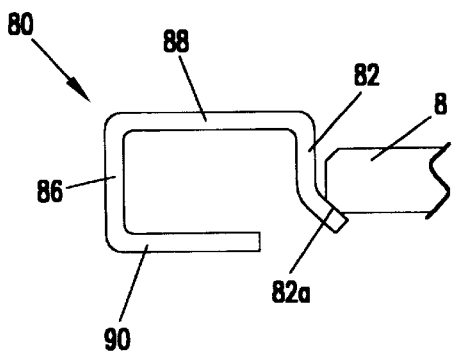
FIG. 8 is a sectional view, taken along line B–B' of FIG. 7, of the second embodiment of the disc mounting ring and a portion of an associated disc.

FIG. 8 is a sectional view, taken along line B–B' of FIG. 7, showing the shape of the disc mounting ring 80, and, in particular, the configuration of the downward-extending fingers 82. The disc mounting ring 80 can be seen to include an inner radial wall 86 which will lie against the spindle motor hub when assembled. The inner radial wall 86 connects upper and lower planar elements 88, 90, which, in turn support the downward-extending fingers 82 and, as will be discussed below with regard to FIG. 9, a similar plurality of upward-extending fingers 84, respectively.

FIG. 8 shows that the downward-extending fingers 82 are formed radially outward near their distal ends to provide a lower disc contact surface 82a which contacts the lower surface of the associated disc 8, generally in the area of the beveled corners (not separately designated) at the inner diameter of the disc 8. From the discussion of FIG. 7 above, it will be recalled that the disc mounting ring 80 includes a plurality of these downward-extending fingers 82. Thus, the plurality of downward-extending fingers provides a corresponding plurality of lower disc contact surfaces 82*a* which act together to form an interrupted planar surface for supporting the disc from the lower side.

Figure 9:
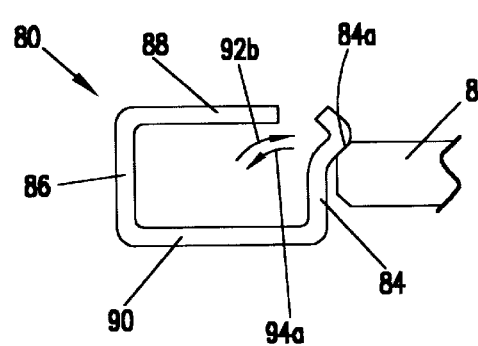
FIG. 9 is a sectional view, taken along line C–C' of FIG. 7, of the second embodiment of the disc mounting ring and a portion of an associated disc.

FIG. 9 is a sectional view, taken along line C–C' of FIG. 7, showing the configuration of the upward-extending fingers 84. As can be seen in the figure, the upward-extending fingers 84 are formed in a compound curve which results in the production of an upper disc contact surface 84*a,* which interacts with the upper surface of the inner diameter of the associated disc 8 in a manner similar to the lower disc contact surface 82*a* of FIG. 8.

The disc mounting ring 80 is envisioned to be formed from a metal having good spring characteristics, allowing the upward-extending fingers 84 to be bent radially inward toward the inner radial wall 86 along the path shown by arrow 92*a.* Once a disc 8 has been placed over the disc mounting ring 8 and brought to rest on the lower disc contact surfaces 82*a* of the downward-extending fingers 82, the upward-extending fingers 84 are allowed to spring back, along the path designated by arrow 92*b,* to their original shape, bringing the upper disc contact surfaces 84*a* into contact with the disc 8. From this and the foregoing discussion of FIG. 8, it is apparent that the combination of downward- and upward-extending fingers 82, 84 act together to axially constrain the disc relative to the disc mounting ring 80.

A comparison of FIGS. 8 and 9 reveals that the lower planar element 90 of the disc mounting ring 80 is radially limited in the region of the downward-extending fingers 82, while the upper planar element 88 is similarly limited in its radial extent in the region of the upward-extending fingers 84.

Figure 10:
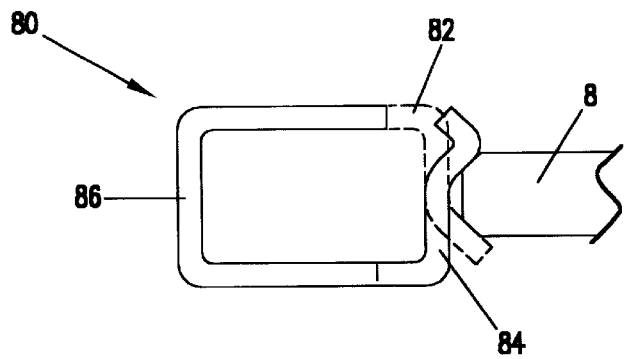
FIG. 10 is a functional diagrammatic view, combining the sectional views of FIGS. 8 and 9, to illustrate the disc positioning function of the disc mounting ring of FIGS. 7 through 9.

FIG. 10 is a diagrammatic sectional elevation view showing the relationship of a disc 8 to both the downward- and upward-extending fingers 82, 84 in a single illustration. Specifically, FIG. 10 is similar to FIG. 9, in that it shows the sectional view of FIG. 9 in solid lines, with the sectional view of FIG. 8 overlayed in dashed lines. That is, the upward-extending finger 84 of the disc mounting ring 80 is shown in solid lines, while the downward-extending finger 82 is shown in dashed lines. It will be recalled from the previous discussion of FIG. 7 that the downward- and upward-extending fingers 82, 84 are in actuality circumferentially displaced from one another.

FIG. 10 does, however, point out that the disc is axially constrained between the lower disc contact surface (82*a* in FIG. 8) and the upper disc contact surface (84*a* in FIG. 9) once the disc 8 has been properly positioned relative to the disc mounting ring 80. That is, the lower surface of the disc will be contacted at multiple points about its circumference by the lower disc contact surfaces (82*a* in FIG. 8) of the downward-extending fingers 82, while the upper surface of the disc will be contacted at multiple points about its circumference by the upper disc contact surfaces (84*a* in FIG. 9) of the upward-extending fingers 84.

Figure 11:
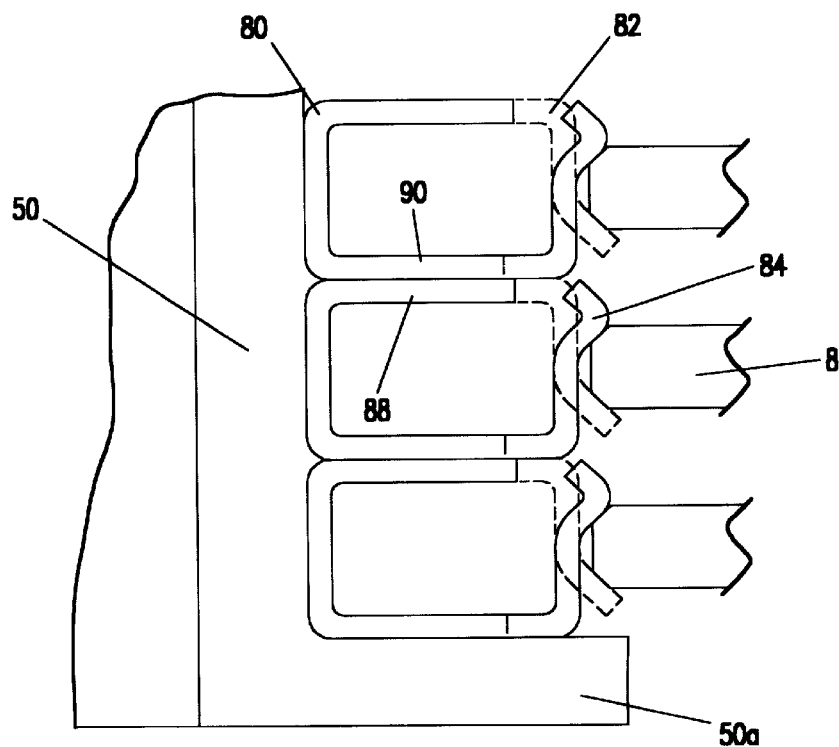
FIG. 11 is a sectional elevation view showing one configuration of components for establishing interdisc spacing.

While FIG. 10 shows the axial positioning mechanism of a single disc mounting ring 80 relative to an associated disc 8, one scheme for establishing the axial positioning of a plurality of disc mounting ring/disc combinations 80/8 relative to the spindle motor hub is shown in FIG. 11.

FIG. 11 is a detail sectional elevation view showing a portion of a spindle motor hub 50 which includes a radially extending disc mounting flange 50*a* at its lower extreme. The figure shows that a plurality of disc mounting rings 80, with associated discs 8 captured between the downward- and upward-extending fingers 82, 84, are placed over the spindle motor hub 50, with the lowermost disc mounting ring 80 resting directly on the disc mounting flange 50*a.* Subsequent disc mounting rings 80 are positioned with their lower planar element 90 contacting the upper planar element 88 of the disc mounting ring 80 below. Thus the relative position of the discs 8 is established solely by the overall axial dimension of the disc mounting rings 80. This scheme for establishing inter-disc spacing requires the inclusion of a disc clamp, such as the disc clamps 36, 40 discussed above in regard to the prior art configurations of FIGS. 2-1 and 2-2.

It will also be appreciated by one of skill in the art that the inner radial wall (86 in FIGS. 8, 9 and 10) can readily be modified to a configuration similar in section to the hub contact feature 66 of FIGS. 5 and 6.

Figure 12:
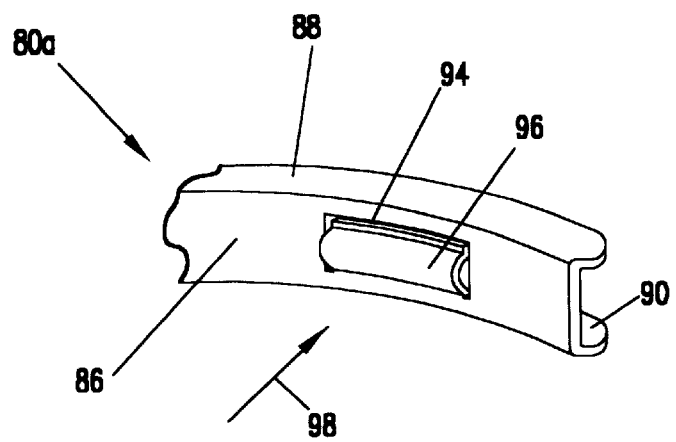
FIG. 12 is a perspective view of a portion of the inner diameter of a disc mounting ring, similar to that of FIGS. 7 through 11, that has been modified to provide hub contact features for axially positioning the disc mounting ring relative to a spindle motor hub.

FIG. 12 is a perspective view of a portion of a disc mounting ring 80*a,* similar to that of FIGS. 7 through 11, but including features for fixedly mounting the disc mounting ring 80*a* to a spindle motor hub similar to that of FIG. 3. In FIG. 12, it can be seen that the inner radial wall 86 of the disc mounting ring 80*a* includes an inverted U-shaped opening 94, which forms a hub contact feature 96 similar in form and function to the hub contact features 66 of FIGS. 4 through 6. While FIG. 12 shows a single hub contact feature 96 formed in the inner radial wall 86 of the disc mounting ring 80*a,* it is envisioned that there will be a plurality of such features arrayed about the circumference of the inner radial wall 86. Details of the formation of the hub contact feature 96 are best seen in FIGS. 13-1 and 13-2.

Figures 1, 13:
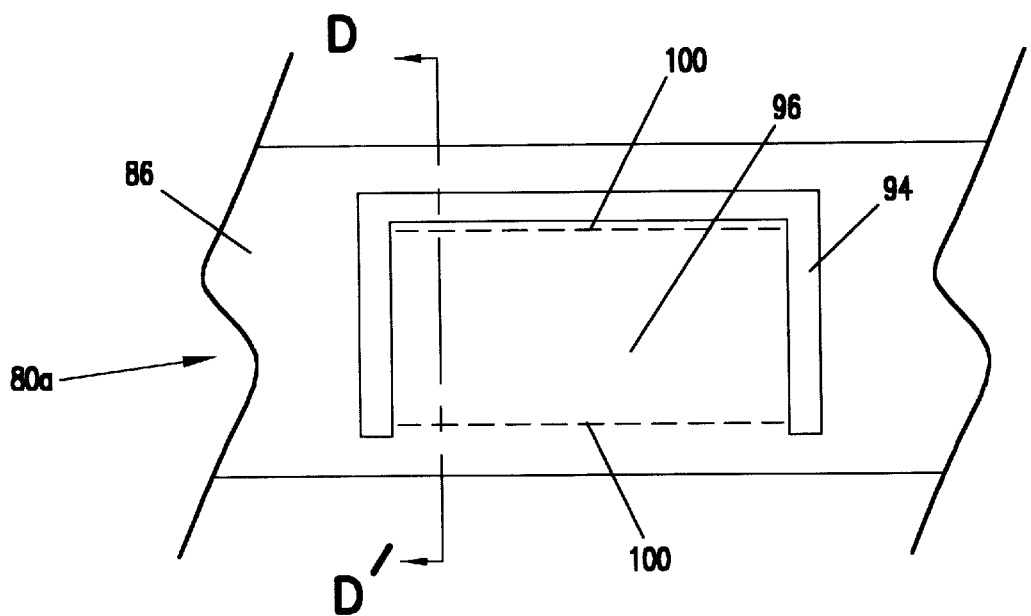
Figures 2, 13:
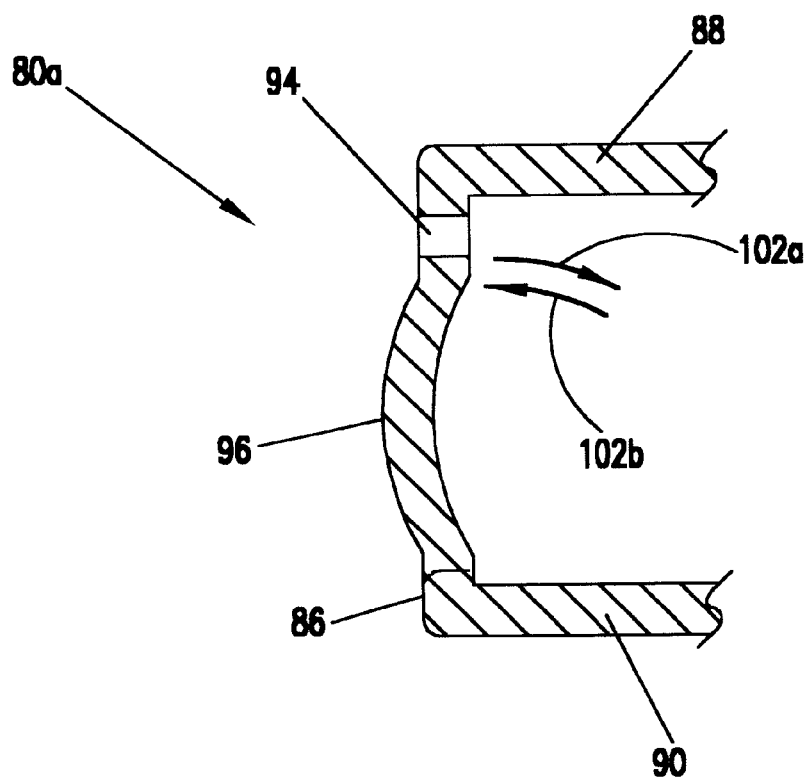

FIG. 13-1 is an elevation view of the disc mounting ring 80*a,* taken along arrow 98 of FIG. 12, that is, looking radially outward at the inner radial wall 86 of the disc mounting ring 80*a.* FIG. 13-1 shows that the inverted U-shaped opening 94 extends around three sides of the hub contact feature 96. The hub contact feature 96 is formed in an arcuate manner from form lines 100 to extend radially inward from the inner radial wall 86. The forming of the hub contact feature 96 is best seen in FIG. 13-2.

FIG. 13-2 is a sectional elevation view of the disc mounting ring 80*a,* taken along line D—D' of FIG. 13-1. The figure shows the upper planar element 88 from which the downward-extending fingers (82 in FIGS. 7, 8 10 and 11) extend, and the lower planar element 90 which support the upward-extending fingers (84 in FIGS. 7, 9, 10 and 11). Connecting the upper and lower planar elements 88, 90 is the inner radial wall 86 in which the hub contact features 96 are formed.

As can be seen in FIG. 13-2, the hub contact feature 96 is formed with an inwardly-extending arcuate profile, similar to the shape of the hub contact features 66 of the first embodiment of the disc mounting ring 60 of FIGS. 5 and 6. The inverted U-shaped opening 94 allows the hub contact feature 96 to be bent radially outward, along arrow 102*a,* to allow the disc mounting ring 80*a* to be placed over a cooperatively dimensioned spindle motor hub. Once the disc mounting ring 80*a* is at its proper axial position relative to the spindle motor hub, the hub contact feature 96 is then allowed to spring back along arrow 102*b* to its original configuration, and engage an annular groove in the spindle motor hub in a manner similar to that described in relationship to the disc mounting ring 60 and spindle motor hub 50 in FIG. 6 above.

In yet another aspect of the present invention, it is envisioned that either embodiment of the disc mounting rings 60, 80 can be fabricated from a shape-memory alloy (SMA). SMAs are well known in the industry, and are typically characterized by having two distinct crystalline states or phases, each of which is achieved at specific temperatures dependent on the exact alloy composition and the fabrication processes used in the manufacture of components. The first of these two phases, the martensitic phase, is characterized by occurring at a lower temperature range than the second, or austenitic, phase. The martensitic phase is also typically "weaker" or more malleable than the austenitic phase. The austenitic phase is sometimes referred to as the "trained" phase. If a SMA component is formed to a particular shape and heated to a transition temperature (dependent upon alloy composition) while held in that shape, the component forms with a "memory" of that shape. When allowed to cool, the material switches to the martensitic phase, and can be bent or deformed with relative ease. If the component is then heated to an activation temperature (again dependent on alloy composition), the component again transforms to its austenitic phase, and recovers the shape in which it was originally "trained". This phase and shape change is accomplished with a high level of force.

The applicability of SMAs to the present invention relates to the fabrication of the disc mounting rings 60, 80. If the disc mounting rings 60, 80 are formed and trained with the shapes shown in FIGS. 5, 8 and 9, and then allowed to cool, they can be mechanically shaped to allow the discs, with the disc mounting rings attached, to be readily placed over the hub of the spindle motor without the use of assembly tools. Once the disc is positioned at its desired axial location relative to the spindle motor hub, the disc mounting rings are heated to their activation temperature, and will recover their "memorized" shape. As the disc mounting rings recover their functional shape, the disc associated with each disc mounting ring will be axially and radially positioned by the disc mounting ring features at the outer diameter of the disc mounting ring (such as the disc contact feature 64 of FIGS. 5 and 6 or the downward- and upward extending fingers 82, 84 of FIGS. 7 through 11), and, if so configured, the disc mounting ring will be axially positioned relative to the spindle motor hub by appropriate features, such as the hub contact feature 66 of FIGS. 5 and 6 or the hub contact feature 96 of FIGS. 12, 13-1 and 13-2, thus establishing a fixed axial and radial positioning of the discs relative to the spindle motor hub.

From the foregoing, it is apparent that the present invention is particularly well suited and well adapted to achieve the objects set forth hereinabove, as well as possessing other advantages inherent therein. While particular configurations of the present invention have been disclosed as example embodiments, certain variations and modifications which fall within the envisioned scope of the invention may be suggested to one of skill in the art upon reading this disclosure. Therefore, the scope of the present invention should be considered to be limited only by the following claims.

What is claimed is:

1. A disc stack, comprising:
   a spindle motor having a hub;
   one or more discs mounted on said hub; and
   disc mounting means associated with each disc for axially and radially fixedly positioning the disc relative to the spindle motor hub.

2. A disc drive comprising:
   a spindle motor hub;
   one or more discs mounted to the spindle motor hub; and
   a disc mounting system for mounting the discs to the spindle motor hub, the disc mounting system further comprising:
      a disc mounting ring associated with one of the discs; and
      a plurality of disc contact features on an outer circumference of the disc mounting ring, the disc contact features being configured such that the position of the associated disc is axially and radially fixed relative to the spindle motor hub solely by the disc contact features.

3. A disc drive as claimed in claim 2 wherein the discs have upper and lower planar surfaces, the disc contact features being configured such that they do not contact either of the planar surfaces of the associated disc.

4. A disc drive as claimed in claim 2 wherein the disc mounting ring further comprises:
   an inner radial wall dimensioned to closely fit over the spindle motor hub;
   an upper planar element extending radially from the inner radial wall; and
   a lower planar element extending radially from the inner radial wall, the upper planar element and the lower planar element being formed such that the disc mounting ring can be stacked on top of another disc mounting ring.

5. A disc drive as claimed in claim 2 wherein the disc mounting ring is fabricated from a shape-memory alloy.

6. A disc drive as claimed in claim 2 wherein the spindle motor hub comprises an annular groove, the disc drive further comprising:
   hub contact features arrayed about an inner circumference of the disc mounting ring for engaging the annular groove in the spindle motor hub.

7. A disc drive as claimed in claim 6 wherein the hub contact features are biased away from the inner circumference of the disc mounting ring.

8. A disc drive as claimed in claim 6 wherein the disc lies within a plane defined by the annular groove.

9. A disc mounting system for mounting one or more discs to a spindle motor hub, the discs having upper and lower planar surfaces, the disc mounting system comprising:
   a disc mounting ring to be associated with one of the discs; and
   a plurality of disc contact features on an outer circumference of the disc mounting ring, each disc contact feature being configured to axially and radially fix the position of the associated disc relative to the spindle motor hub without contacting either of the planar surfaces of the associated disc.

10. A disc mounting system as claimed in claim 9 wherein the spindle motor hub comprises an annular groove, the disc mounting system further comprising:
    hub contact features arrayed about an inner circumference of the disc mounting ring for engaging the annular groove in the spindle motor hub.

11. A disc mounting system as claimed in claim 10 wherein the hub contact features are biased away from the inner circumference of the disc mounting ring.

12. A disc mounting system as claimed in claim 10 configured to fix the position of the disc within a plane defined by the annular groove.

13. A disc mounting system as claimed in claim 9 wherein the disc mounting ring further comprises:
    an inner radial wall dimensioned to closely fit over the spindle motor hub;
    an upper planar element extending radially from the inner radial wall; and
    a lower planar element extending radially from the radial wall; and a lower planar element extending radially from the inner radial wall, the upper planar element and the lower planar element being formed such that the disc mounting ring can be stacked on top of another disc mounting ring.

14. A disc mounting system as claimed in claim 9 wherein the disc mounting ring is fabricated from a shape-memory alloy.

* * * * *